US009720641B2

(12) United States Patent
Satake et al.

(10) Patent No.: US 9,720,641 B2
(45) Date of Patent: Aug. 1, 2017

(54) PLAYBACK MANAGEMENT DEVICE AND PROGRAM USED THEREFOR

(71) Applicant: DeNA Co., Ltd., Tokyo (JP)

(72) Inventors: Takayasu Satake, Tokyo (JP); Wataru Kawasaki, Tokyo (JP); Mamoru Yamashiki, Tokyo (JP)

(*) Notice: Subject to any disclaimer, the term of this patent is extended or adjusted under 35 U.S.C. 154(b) by 0 days.

(21) Appl. No.: 14/429,762

(22) PCT Filed: Sep. 13, 2013

(86) PCT No.: PCT/JP2013/074799
§ 371 (c)(1),
(2) Date: Jul. 27, 2015

(87) PCT Pub. No.: WO2014/046022
PCT Pub. Date: Mar. 27, 2014

(65) Prior Publication Data
US 2015/0363158 A1 Dec. 17, 2015

(30) Foreign Application Priority Data
Sep. 21, 2012 (JP) ................................. 2012-208632

(51) Int. Cl.
*G06F 17/00* (2006.01)
*G06F 3/16* (2006.01)
(Continued)

(52) U.S. Cl.
CPC .............. *G06F 3/165* (2013.01); *G06F 21/10* (2013.01); *G06Q 30/06* (2013.01); *G06Q 50/10* (2013.01); *H04H 60/87* (2013.01)

(58) Field of Classification Search
CPC ......... G06F 3/165; G06F 21/10; G06Q 30/06; G06Q 30/10; H04H 60/87
(Continued)

(56) References Cited

U.S. PATENT DOCUMENTS

| 6,745,328 B1* | 6/2004 | Searle ..................... G06F 21/10 713/161 |
| 7,181,300 B2* | 2/2007 | Robbins ................. G06Q 20/20 348/E7.063 |

(Continued)

FOREIGN PATENT DOCUMENTS

JP 2002-099739 A 4/2002
JP 2002-342518 A 11/2002
(Continued)

OTHER PUBLICATIONS

Final Office Action as issued in Japanese Patent Application No. 2012-208632, dated Oct. 1, 2013.
(Continued)

*Primary Examiner* — Paul McCord
(74) *Attorney, Agent, or Firm* — Pillsbury Winthrop Shaw Pittman LLP

(57) ABSTRACT

A music distribution server according to an embodiment provides a service in which users can easily enjoy digital contents. The server may include an information storage unit storing various tables and data bases, a playback transmission unit transmitting, in response to playback requests, music data to a terminal device in a streaming method, and a purchase transmission unit transmitting, in response to a purchase request, the music data to the terminal device in a downloading method, a ticket possession status update unit updating a possession status of virtual tickets used for playback of the music data possessed by users, a ticket providing unit providing the virtual tickets to users, a comment management unit managing users' comments on music pieces, a recommendation management unit managing recommendation of music pieces by one user to other users, and a ticket offer management unit offering the virtual tickets from one user to other users.

9 Claims, 15 Drawing Sheets

(51) Int. Cl.
*G06F 21/10* (2013.01)
*G06Q 30/06* (2012.01)
*G06Q 50/10* (2012.01)
*H04H 60/87* (2008.01)

(58) Field of Classification Search
USPC .......................................................... 700/94
See application file for complete search history.

(56) References Cited

U.S. PATENT DOCUMENTS

| | | | | |
|---|---|---|---|---|
| 8,094,949 | B1* | 1/2012 | Rhoads | H04N 1/00424 382/232 |
| 2002/0107806 | A1 | 8/2002 | Higashi et al. | |
| 2003/0047602 | A1* | 3/2003 | Iida | G06F 17/30017 235/382 |
| 2003/0084306 | A1* | 5/2003 | Abburi | G06F 21/10 713/188 |
| 2004/0078331 | A1* | 4/2004 | Fakih | G06Q 20/10 705/40 |
| 2005/0114205 | A1* | 5/2005 | Nelson | G06F 21/10 705/14.47 |
| 2005/0278259 | A1* | 12/2005 | Gunaseelan | G06F 21/10 705/59 |
| 2006/0053079 | A1* | 3/2006 | Edmonson | G06F 21/10 705/59 |
| 2006/0112006 | A1* | 5/2006 | Hurwitz | G06Q 20/102 705/40 |
| 2006/0167817 | A1* | 7/2006 | Gajjala | G06F 21/10 705/59 |
| 2006/0212442 | A1* | 9/2006 | Conrad | G06F 17/30026 |
| 2007/0038470 | A1 | 2/2007 | Nakamura et al. | |
| 2007/0124603 | A1* | 5/2007 | Yamamichi | G06F 21/10 713/194 |
| 2007/0156594 | A1* | 7/2007 | McGucken | G06F 21/10 705/51 |
| 2008/0071617 | A1* | 3/2008 | Ware | G06Q 30/00 705/14.26 |
| 2009/0089249 | A1* | 4/2009 | Verosub | G06F 17/30038 |
| 2009/0234472 | A1* | 9/2009 | Pyle | H04N 21/2541 700/94 |
| 2009/0271413 | A1 | 10/2009 | Hoashi et al. | |
| 2010/0082448 | A1* | 4/2010 | Lin | G06F 21/10 705/26.1 |
| 2010/0114739 | A1* | 5/2010 | Johnston | G06Q 30/0601 705/26.1 |
| 2010/0306081 | A1* | 12/2010 | Hutchison | G06Q 20/02 705/26.43 |
| 2011/0208616 | A1* | 8/2011 | Gorman | G06F 17/30743 705/27.1 |
| 2011/0231767 | A1* | 9/2011 | Russell | G06F 17/3087 715/733 |
| 2013/0065668 | A1* | 3/2013 | LeMay | G07F 17/3223 463/25 |
| 2014/0235202 | A1* | 8/2014 | Lee | H04M 15/51 455/407 |
| 2015/0310476 | A1* | 10/2015 | Gadwa | G06Q 30/0226 705/14.27 |
| 2016/0012465 | A1* | 1/2016 | Sharp | G06Q 20/18 705/14.17 |

FOREIGN PATENT DOCUMENTS

| | | |
|---|---|---|
| JP | 2006-172392 A | 6/2006 |
| JP | 2007-052473 A | 3/2007 |
| JP | 2007-529054 A | 10/2007 |
| JP | 2009-266083 A | 11/2009 |
| JP | 2010-009194 A | 1/2010 |
| JP | 2011-129032 A | 6/2011 |

OTHER PUBLICATIONS

Non-Final Office Action as issued in Japanese Patent Application No. 2012-208632, dated May 14, 2013.
International Search Report as issued in International Patent Application No. PCT/JP2013/074799, dated Oct. 15, 2013.
Non-Final Office Action as issued in Japanese Patent Application No. 2015-228614, dated Oct. 11, 2016.

* cited by examiner

| User ID | The Number of Tickets |
|---|---|
| U000001 | 20 |
| U000002 | 4 |
| U000003 | 6 |
| U000004 | 36 |
| U000005 | 12 |
| U000006 | 6 |
| U000007 | 4 |
| ... | ... |

Fig. 4

| User ID | Ticket ID | Ticket Type ID | Remaining Usage Information |
|---|---|---|---|
| U000001 | T7123178521 | TT01 | Once |
| U000001 | T0065467852 | TT02 | Once |
| U000001 | T1681506161 | TT04 | 22 Minutes |
| U000004 | T2040020012 | TT03 | Twice |
| U000004 | T9418308052 | TT01 | Once |
| U000004 | T3963666477 | TT03 | Three times |
| U000004 | T9900601455 | TT04 | 44 Minutes |
| ... | ... | ... | ... |

Fig. 11

| Ticket Type ID | Track Restriction | Limitations Of Plays And Time |
|---|---|---|
| TT01 | No | Once |
| TT02 | Artist A | Once |
| TT03 | No | Three Times |
| TT04 | No | 60 minutes |
| TT05 | Track "a" | Once |
| ... | ... | ... |

Fig. 12

PLAYBACK MANAGEMENT DEVICE AND PROGRAM USED THEREFOR

CROSS-REFERENCE TO RELATED APPLICATIONS

This is the U.S. National Stage of PCT/JP2013/074799, filed Sep. 13, 2013, which in turn claims the benefit of priority from Japanese Patent Application Serial No 2012-208632 (filed on Sep. 21, 2012), the entire contents of all applications are incorporated herein by reference in their entireties.

TECHNICAL FIELD

The present disclosure relates to a playback management device, and in particular to a playback management device for managing playback of digital contents by a user who operates a user terminal connected via a communication network and is provided with the digital contents.

BACKGROUND

There are conventionally known services for selling digital contents such as music data wherein users can tentatively enjoy part of the contents before the users purchase the contents. In such services, users purchasing music data for example can preview a particular part such as a melodious part of an entire stretch of a musical piece before the purchase. There have been proposed such preview services of music wherein contents are provided in accordance with users' preferences estimated based on use history of the users (see, e.g., Japanese Patent Application Publication No. 2009-266083).

SUMMARY

However, in such preview services of music, it is possible to easily preview a limited stretch but difficult to easily preview an entire stretch of a musical piece. There is a demand for a service allowing users to easily preview an entire digital content, not a limited part of a digital content.

One object of the present disclosure is to provide a service allowing users to easily enjoy digital contents. Other objects of the present disclosure will be apparent with reference to the entire description in this specification.

A playback management device according to an embodiment is for managing playback of digital contents by a user who operates a user terminal device connected via a communication network and is provided with the digital contents. The device may include an information storage unit configured to store possession status of virtual tickets in association with the user, the virtual tickets are used for playback of digital contents. The device may further include a playback transmission unit configured to transmit a digital content to the user terminal device which the user operates in response to a playback request of the digital content and to cause the user terminal device to play the digital content, and a possession status update unit configured to update the possession status of the virtual tickets of the user who performed the playback request stored in the information storage unit in response to transmission of the digital content.

A storage medium according an embodiment stores a program causing a computer to function as a playback management device for managing playback of digital contents by a user who operates a user terminal device that is connected via a communication network and provided with the digital contents, the computer being accessible to an information storage unit configured to store possession status of virtual tickets in association with the user. The program causes the computer to: perform a playback transmission process by transmitting a digital content to the user terminal device which the user operates in response to a playback request of the digital content and causing the user terminal device to play the digital content; and perform a possession status update process by updating the possession status of the virtual tickets possessed by the user who performed the playback request stored in the information storage unit in response to transmission of the digital content.

Various embodiments of the present invention provide a service allowing users to enjoy digital contents easily.

BRIEF DESCRIPTION OF THE DRAWINGS

FIG. 4 shows an example of a ticket management table according to the embodiment.

FIG. 11 shows an example of a ticket management table according to the other embodiment.

FIG. 12 shows an example of a ticket type management table according to the other embodiment.

DESCRIPTION OF THE PREFERRED EMBODIMENTS

Figure 1:
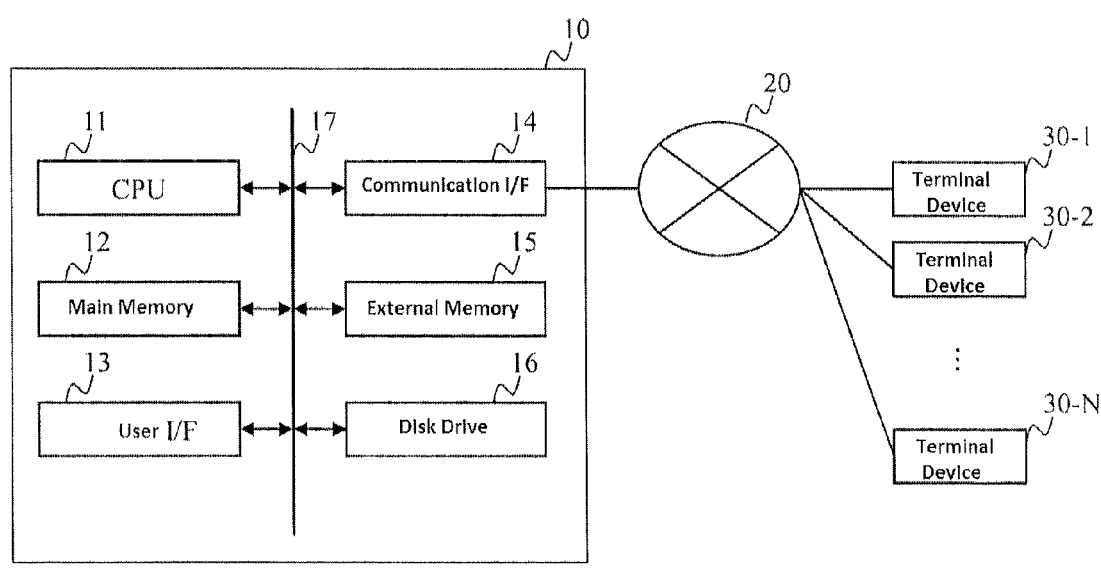
FIG. 1 is a block diagram schematically illustrating a system including a music distribution server that also serves as a playback management device according to an embodiment of the present disclosure.

Various embodiments of the present invention will be described hereinafter with reference to the drawings. In the drawings, the same components are denoted by the same reference numerals.

FIG. 1 is a block diagram schematically illustrating a system including a music distribution server 10 that also serves as a playback management device according to an embodiment of the present disclosure. As illustrated in FIG. 1, the music distribution server 10 may be communicatively connected to a plurality of terminal devices 30-1, 30-2, . . .

, and 30-N (hereinafter also collectively referred to as the "terminal devices 30"), each having a communication function, via a communication network 20 such as the Internet. The music distribution server 10 may provide users operating the terminals 30 with a music distribution service.

As illustrated, the music distribution server 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminals 30 via the communication network 20.

The external memory 15 may be constituted by, for example, a magnetic disk drive and store an operating system, various programs, and various data. The various data that may be stored in the external memory 15 may also be stored on a database server communicatively connected to the music distribution server 10 and physically separate from the music distribution server 10. The disk drive 16 may read data stored in storage medium such as a compact disc read only memory (CD-ROM), digital versatile disc read only memory (DVD-ROM), or DVD Recordable (DVD-R) disc, or write data to such a storage medium.

In an embodiment, the music distribution server 10 may serve as a web server for communicating with the terminal devices 30 in HTTP to manage a web site including a plurality of hierarchical web pages and provide download distribution of music data in response to a request from the terminals 30. In an embodiment, the music distribution server 10 may serve as a streaming server for providing streaming distribution of music data using protocols such as Real Time Streaming Protocol (RTSP), wherein the music distribution server 10 may provide streaming distribution of music data in response to a request from the terminals 30.

In an embodiment, the terminal device 30 may be a desired information processing device including an application execution environment for executing an application including a web browser. Non-limiting examples of the terminal device 30 may include mobile phones, smartphones, tablet terminals, personal computers, electronic book readers, and game consoles. The terminal device 30 may access the music distribution server 10 to display a web page provided by the music distribution server 10, and may receive music data through streaming delivery or download and play back the distributed music data.

Figure 2:
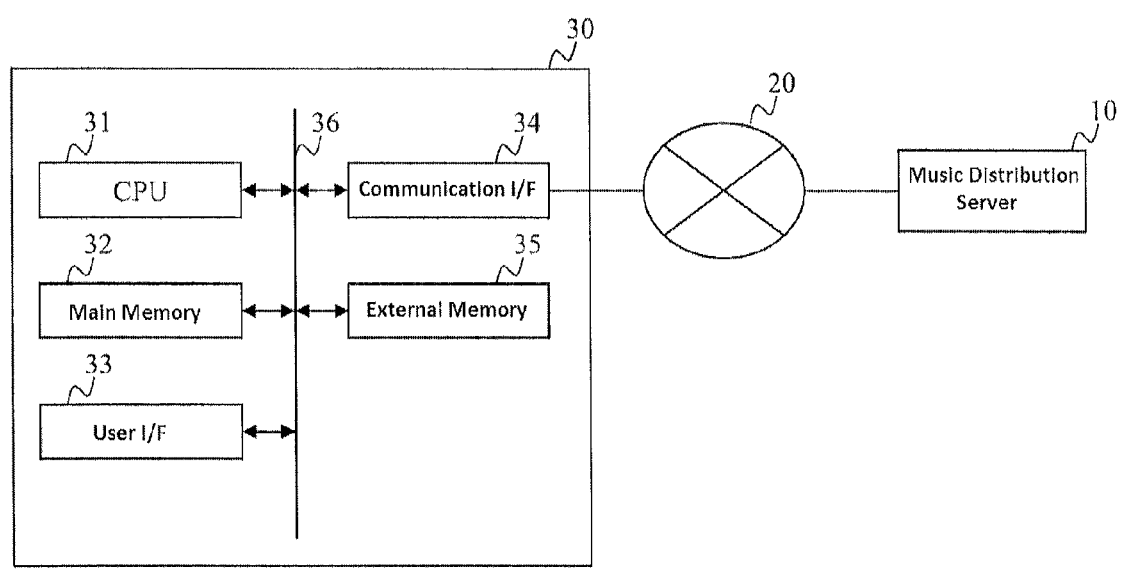
FIG. 2 is a block diagram schematically illustrating the architecture of a terminal device according to the embodiment.
Figure 3:
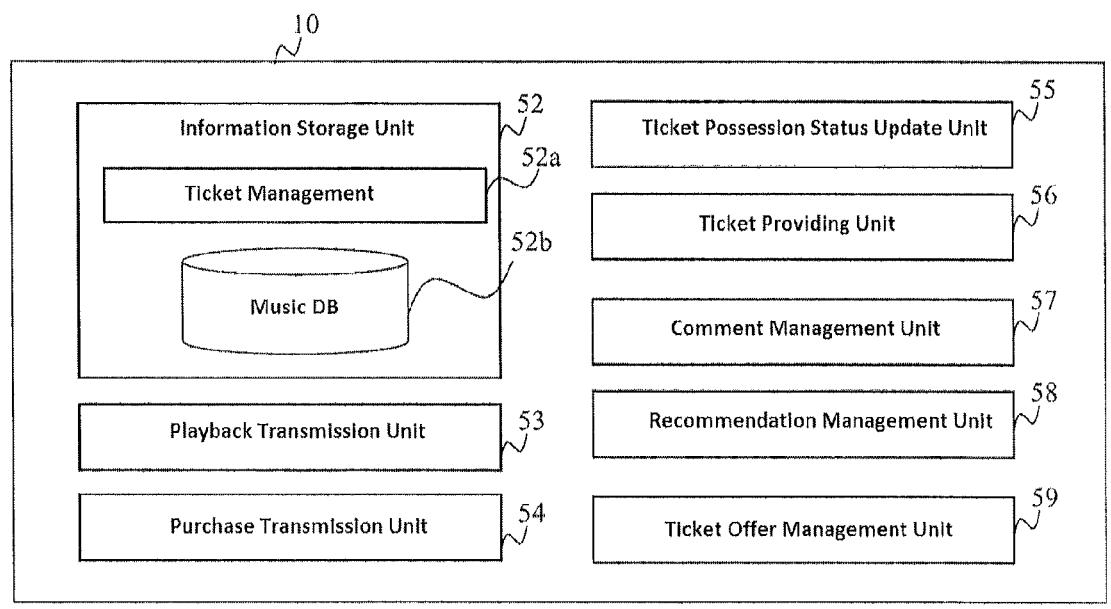
FIG. 3 is a block diagram illustrating the functionality of the music distribution server according to the embodiment.

The architecture of the terminal device 30 will now be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may be used to store a program to be executed by the CPU 31, and may be formed of, for example, a dynamic random access memory (DRAM).

The user I/F 33 may include, for example, an information input device such as a touch panel, a keyboard, a button, and a mouse for accepting an input from a user, and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the music distribution server 10 via the communication network 20.

The external memory 35 may comprise, for example, a magnetic disk drive or a flash memory and store various programs such as an operating system.

A terminal device 30 having such an architecture may include, for example, browser software for interpreting an HTML file (HTML data) and rendering a screen; this browser software may enable the terminal device 30 to interpret the HTML data fetched from the music distribution server 10 and render web pages corresponding to the received HTML data. Further, the terminal device 30 may include plug-in software embedded into browser software; therefore, the terminal device 30 can play back a multimedia file such as music data embedded in HTML data by using the browser software and the plug-in software.

Next, the functionality of the music distribution server 10 implemented by the components shown in FIG. 1 will now be described. The music distribution server 10 may include an information storage unit 52 configured to store various tables and data bases, a playback transmission unit 53 configured to transmit, in response to playback requests from users, a whole music data to the terminal device 30 in a streaming method in which reuse of the music is restricted in the terminal device 30, and a purchase transmission unit 54 configured to transmit, in response to a purchase request from the users, the entire stretch of the music data to the terminal device 30 in a downloading method in which the reuse of the music data is allowed. The music distribution server 10 may further include a ticket possession status update unit 55 configured to update a possession status of virtual tickets possessed by the users, the virtual tickets are used for playback of music data. The music distribution server 10 may further include a ticket providing unit 56 to provide the virtual tickets to the users, a comment management unit 57 configured to manage users' comments on music pieces, a recommendation management unit 58 configured to manage recommendation of music pieces by one user to other users, and a ticket offer management unit 59 configured to manage offering of the virtual tickets from one user to other users. These functions may be implemented through cooperation between the CPU 11 and programs, tables, and the like stored in the main memory 12 and the external memory 15.

The information storage unit 52 may include a ticket management table 52a with which a virtual ticket possession status of a user may be managed, and a music database 52b which is a database of music data. The ticket management table 52a may store the "number of virtual tickets" which the user holds in association with a "user ID" as illustrated in FIG. 4. The music database 52b may store music data that can be provided to users in a file format such as Advanced Audio Coding (AAC) and Windows™ Media Audio (WMA). The music data base 52b may not be necessarily stored within the music distribution server 10 but may be alternatively stored in any other server devices with which the music distribution server 10 is communicatively connected.

Figure 5:
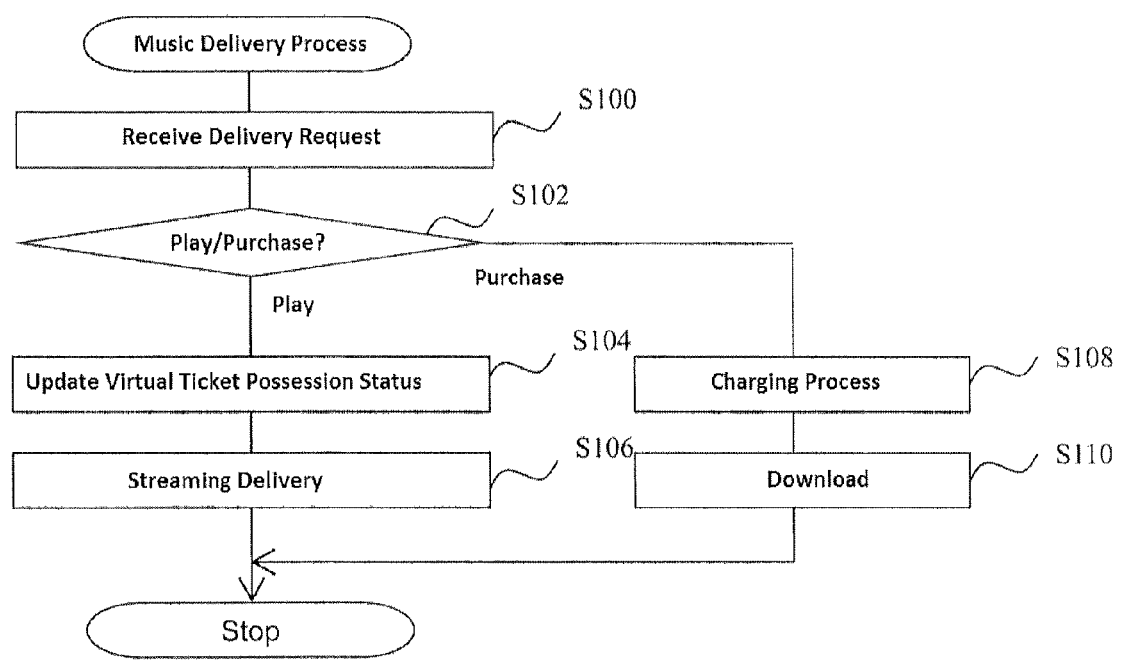
FIG. 5 is a flow diagram showing a music delivery process according to the embodiment.

Next, operations of the music distribution server 10 according to the embodiment of the disclosure will now be described. Firstly described hereunder will be a music delivery process in which music data is delivered in response to a request from a user, secondly described will be various actions by the user that trigger provision of the above-described virtual ticket to the user, and thirdly described will be an offering process in which the user offers other users the virtual tickets which the user possesses. FIG. 5 is a flow diagram showing an example of a music delivery process performed by the music distribution server 10. In the music delivery process, a distribution request from a user who operates the terminal device 30 may be firstly received (step S100). More specifically, when the user operating the terminal device 30 operates a basic screen 70 which is a home screen where a distribution request for music data and the like is performed, data indicating a request of music data delivery may be transmitted from the terminal device 30 and then received by the music distribution server 10. The basic screen 70 where a user performs a distribution request for music data will be now described.

Figure 6:
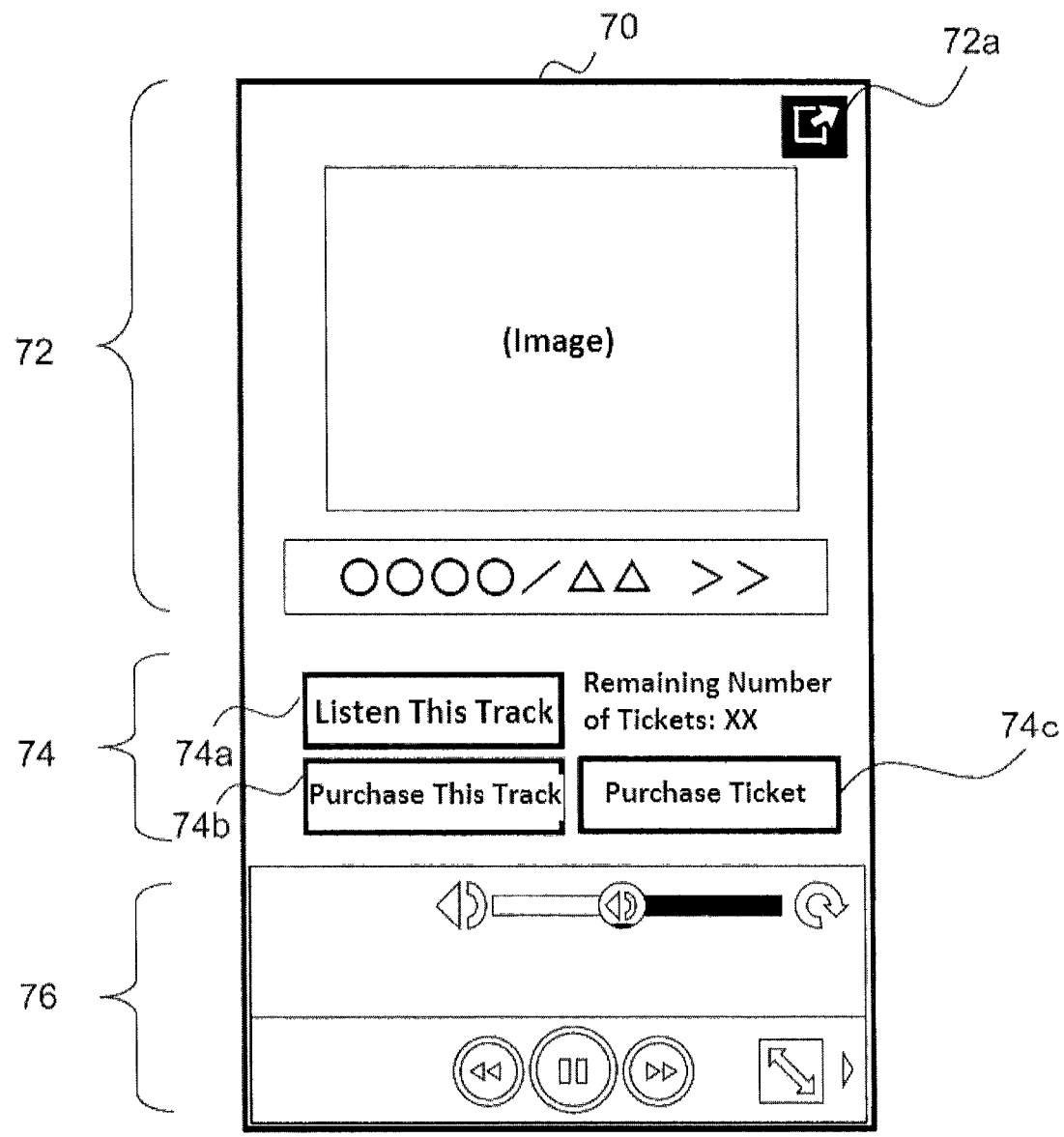
FIG. 6 shows an example of a basic screen 70 according to the embodiment.

An example of the basic screen 70 is shown in FIG. 6. The basic screen 70 may be displayed on the terminal device 30 when a user makes a search using a key word among a plurality of pieces of music distributed by the music distribution server 10 and when a user selects, from among a list of recommended musical pieces, a piece of music which the user likes. As illustrated in FIG. 6, the basic screen 70 may include a basic information display section 72, a request operation section 74, and a playback operation section 76 in the upper, middle and lower sections of the screen respectively. The basic information display section 72 may show an image corresponding to a selected piece of music and basic information about the selected piece of music including a title of the music. The request operation section 74 is for performing a music data delivery request. The playback operation section 76 is for playback control of a piece of music. As illustrated in FIG. 6, the request operation section 74 may include a playback request button 74a represented as "listen this track," a purchase request button 74b represented as "purchase this track," and a ticket purchase button 74c represented as "purchase ticket." The number of virtual tickets which the user currently holds is shown above the ticket purchase button. The number of virtual tickets which the user holds may be obtained from the ticket management table 52a and then shown. In one embodiment, the music data delivery request may include a playback request performed by selecting the playback request button 74a, and a purchase request performed by selecting the purchase request button 74b. When a user selected the playback request button 74a or the purchase request button 74b, data that requests delivery corresponding to the selected button may be transmitted from the terminal device 30. On the upper right corner of the basic information display section 72, provided is a screen transition button 72a that may be linked to a comment input screen 80 in which a user makes a comment on the piece of music or a track recommendation screen 90 in which a user makes recommendation of the piece of music. The comment input screen 80 and the track recommendation screen 90 will hereunder be described in detail.

Referring again to the flow diagram of FIG. 5, when a user selected the playback request button 74a on the basic screen 70, it may be determined that a playback request of music data using a virtual ticket has been made (step S102) and the virtual ticket possession status of the user may be updated (step S104). More specifically, the "number of virtual tickets" corresponding to the "user ID" of the user who performed the playback request may be reduced by one (1) in the ticket management table 52a. If the number of the virtual tickets which the user possesses is zero (0), the playback request button 74a on the basic screen 70 may be deactivated such that the user cannot select the playback request button 74a, or an error message or a message prompting the user to purchase virtual tickets may be displayed when the playback request button 74a was selected and the ticket management table 52a is updated.

After updating the virtual ticket possession status, streaming delivery of music data of the selected piece of music may be performed (step S106), and the music delivery may be terminated More specifically, the streaming delivery may be performed such that data of the entire music stored on the music database 52b may be transferred to the terminal device 30 by using a protocol such as RTSP. Once the streaming delivery commences, the terminal device 30 may be able to playback the music while downloading the data of the entire music, and a user may be able to perform various operations (pause, fast-forward, rewind, volume adjustment and the like) through the playback operation section 76 on the basic screen 70. The music data delivered by such streaming may be tentatively stored on the terminal device 30 as cache data and may be deleted afterward to restrict reuse of the music data on the terminal device 30. A part or the whole of the music data delivered by streaming may also be previously buffered on the terminal device 30.

When the purchase request button 74b on the basic screen 70 was selected by a user, it may be determined that a purchase request of music data is performed (step S102) and a charging process for the music data purchase may be performed. The charging process may be performed by using various payment services provided by credit card companies or mobile phone carriers. Since such a charging process is conventional, further detailed description will be omitted.

After the charging process, download of the selected piece of music may be performed (step S110), and the music delivery process may be completed. More specifically, a file of music data stored on the music database 52b may be transferred to the terminal device 30 by using a protocol such as HTTP. When the file transfer is completed in the download process, the terminal device 30 may be able to playback the music data using browser software, plug-in software, or a player application specially made for the playback of music data. Unlike the streaming delivery described above, the music data delivered by such download may be kept stored on the terminal device 30 and a user may be allowed to reuse the music data on the terminal device 30. In the above example, the download of the music data is performed subsequent to the charging process. Alternatively, the music delivery process may be terminated after the charging process and the download may be performed at any timing in response to a request from a user. Moreover, the music data is transferred to the terminal device 30 in the above example. Alternatively, a file of the music data may be transferred to a device other than the terminal device 30.

The music delivery process has been described. Various actions by a user that trigger provision of virtual tickets to the user will be now described. In one embodiment, a virtual ticket may be imparted to a user when the user (1) makes a purchase request of a virtual ticket, (2) inputs a comment on a piece of music, and (3) makes a recommendation of a piece of music to other users. More specifically, the "number of virtual tickets" corresponding to the "user ID" of the user in the ticket management table 52a may be updated. "(1) When a user makes a purchase request of virtual ticket" means when the user selected the ticket purchase button 74c in the request operation section 74 on the above-described basic screen 70. In this case, one or more virtual tickets are provided to the user after a common charging process. Here, a price for a virtual ticket in one embodiment may be set lower than a unit price for purchase (download) of music data of a piece of music. For instance, the price for a virtual ticket may be set to 1/50 of the unit price for music data.

Figure 7:
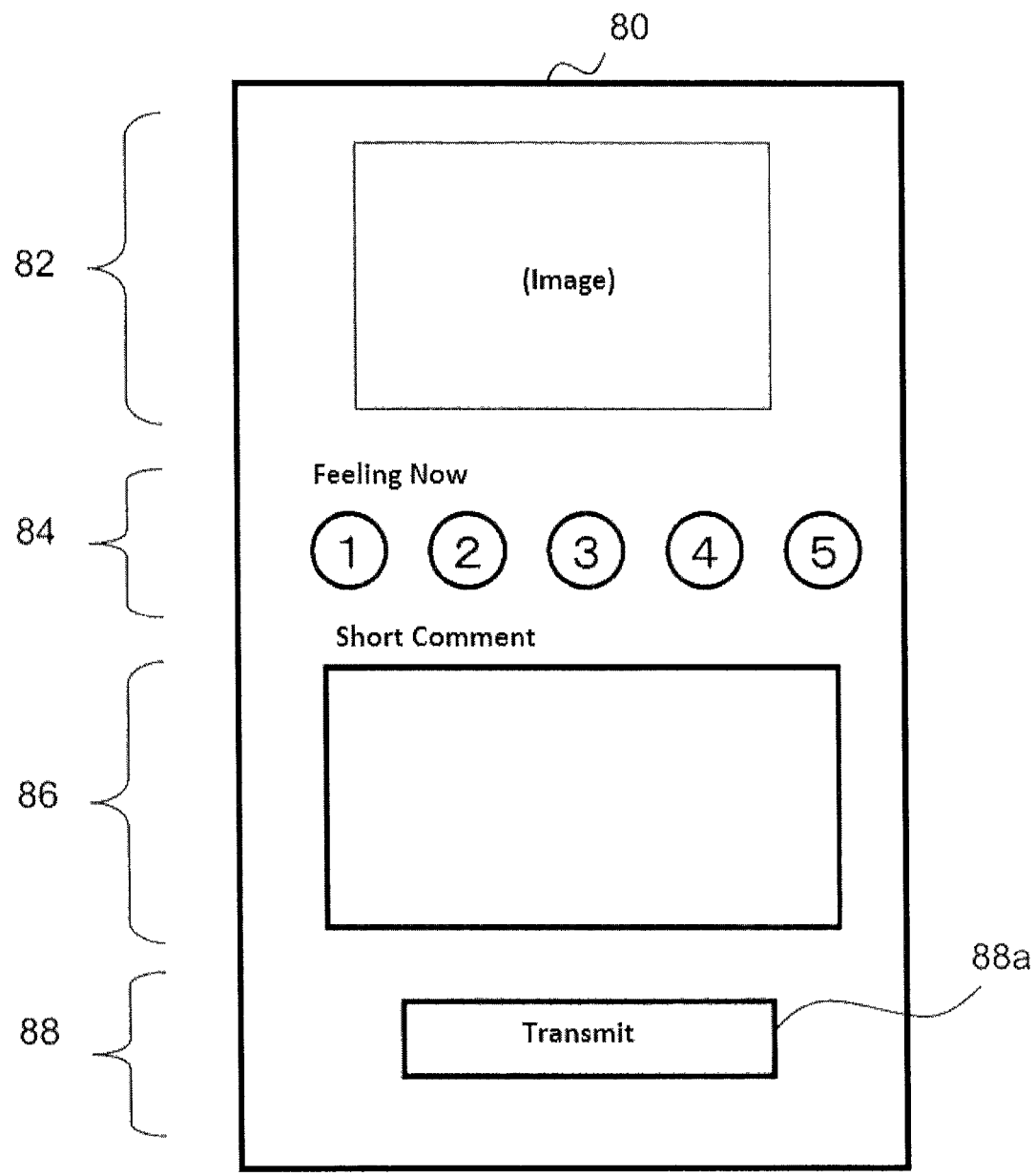
FIG. 7 shows an example of a comment input screen 80 according to the embodiment.

"(2) When a user inputs a comment on a piece of music" means when a user inputs a comment on a piece of music through the comment input screen 80 illustrated in FIG. 7. The comment input screen 80 is a screen displayed on the terminal device 30 when the screen transition button 72a in the basic information display section 72 on the basic screen 70 is selected and displaying of the comment input screen 80 is instructed. As shown in FIG. 7, the comment input screen 80 may include a basic information display section 82 showing a basic information about a piece of music, a select input section 84 in which a user selects and inputs a "feeling now" from among five choices, a free input section 86 in which a user inputs a free "short comment" on a piece of music which the user is listening to, and a transmission instruction section 88 that has a transmit button 88a, in the upper, middle and lower sections of the screen respectively. Once a user selects and inputs the "feeling now" through the select input section 84 as listening to a piece of music, further inputs a free comment through the free input section 86, and then selects the transmit button 88a, the input data is transmitted to the music distribution server 10 and stored in the information storage unit 52 such that the data can be referable from other users. In this case, the user may obtain a virtual ticket as a reward for inputting the comment without the charging process. The comment on a piece of music is inputted in the above-described embodiment. However, comments on an album including pieces of music or an artist may be input and a virtual ticket may be imparted to the user as a reward.

Figure 8:
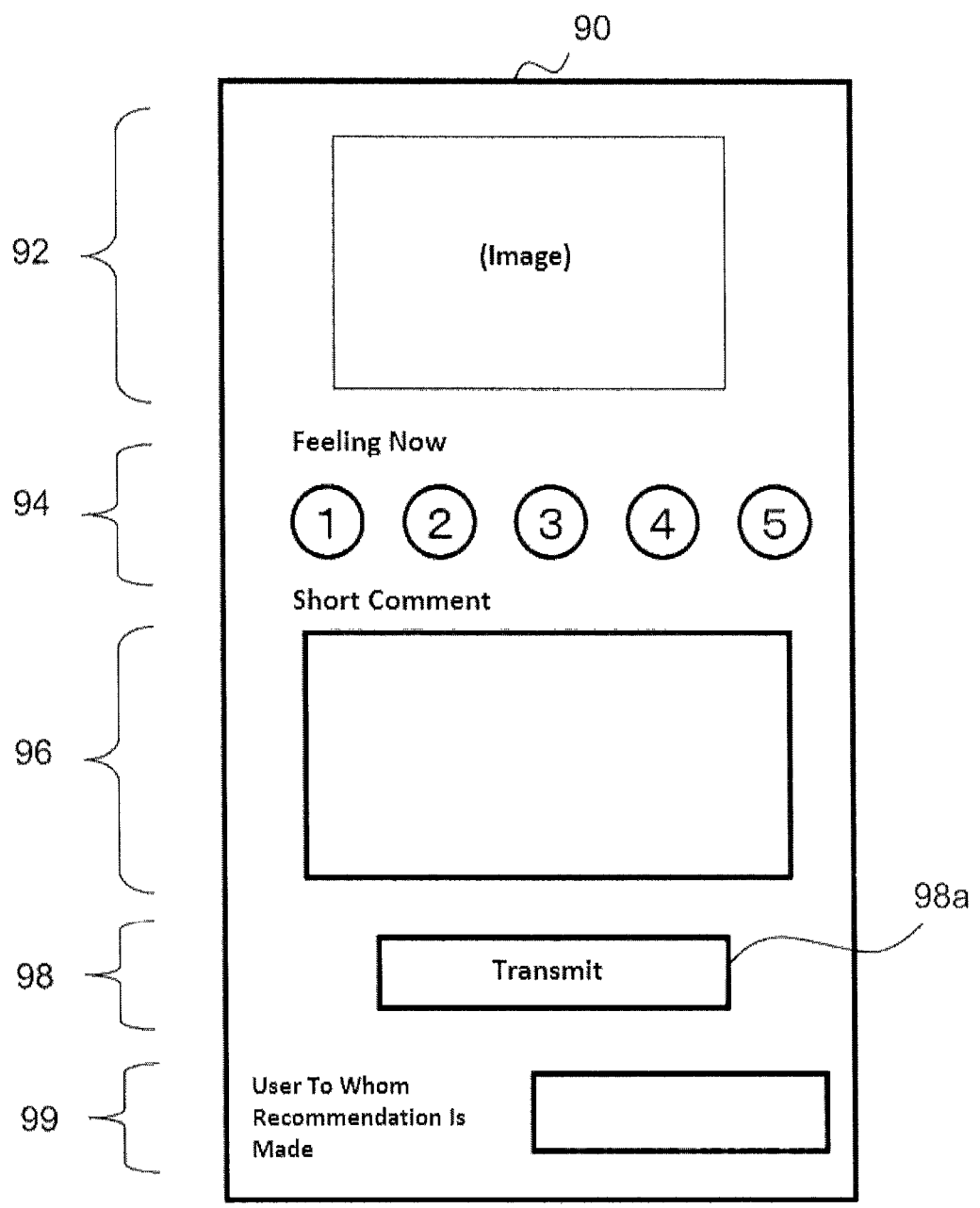
FIG. 8 shows an example of a track recommendation screen 90 according to the embodiment.

"(3) When a user makes a recommendation of a piece of music to other users" means when a user recommends a piece of music to other users through the track recommendation screen 90 illustrated in FIG. 8. The comment input screen 90 may be displayed on the terminal device 30 when the screen transition button 72a in the basic information display section 72 on the above-described basic screen 70 is selected and displaying of the track recommendation screen 90 is instructed. As shown in FIG. 8, the track recommendation screen 90 may include, like the comment input screen 80, a basic information display section 92, a select input section 94, a free input section 96, and a transmission instruction section 98. The track recommendation screen 90 may further include a recommendation user input section 99 in which a user selects a user to recommend the piece of music. The recommendation user input section 99 may allow a user to select and input a user to whom the user recommends the piece of music from among users registered as friends in advance. Once a user inputs information through the select input section 94, the free input section 96, and the recommendation user input section 99, and then selects a transmit button 98a, the input data is transmitted to the music distribution server 10 and stored in the information storage unit 52 such that the data is referable from the users selected in the recommendation user input section 99. In this case, the user may obtain, without the charging process, a virtual ticket as a reward for recommending a piece of music to other user. In the above-described embodiment, a user selects, in the recommendation user input section 99, a user to whom the user recommends the piece of music from among the users registered as friends in advance. However, the input section 99 may alternatively allow the user to select from among all the users registered in the music distribution server 10.

The various actions by a user that trigger provision of virtual tickets to the user have been described. Here note that a virtual ticket may not be necessarily imparted to the user when the user inputs a comment on a piece of music through the comment input screen 80 and when the user recommends a piece of music to other users through the track recommendation screen 90. Without imparting virtual tickets, it may be possible to promote communication between users within the music distribution service. Moreover, an incentive other than the virtual tickets may be given to a user in response to the user's action such as input of a comment and recommendation on a piece of music for other users. For instance, an electronic item (for example, a budge) of an artist whose music a user made a comment, recommended to other users, or downloaded its music data may be imparted to the user. The imparted item may be displayed on a page where the user's profile is shown. In this manner, it is possible to activate user's actions within the music distribution service and promote communication among users.

Figure 9:
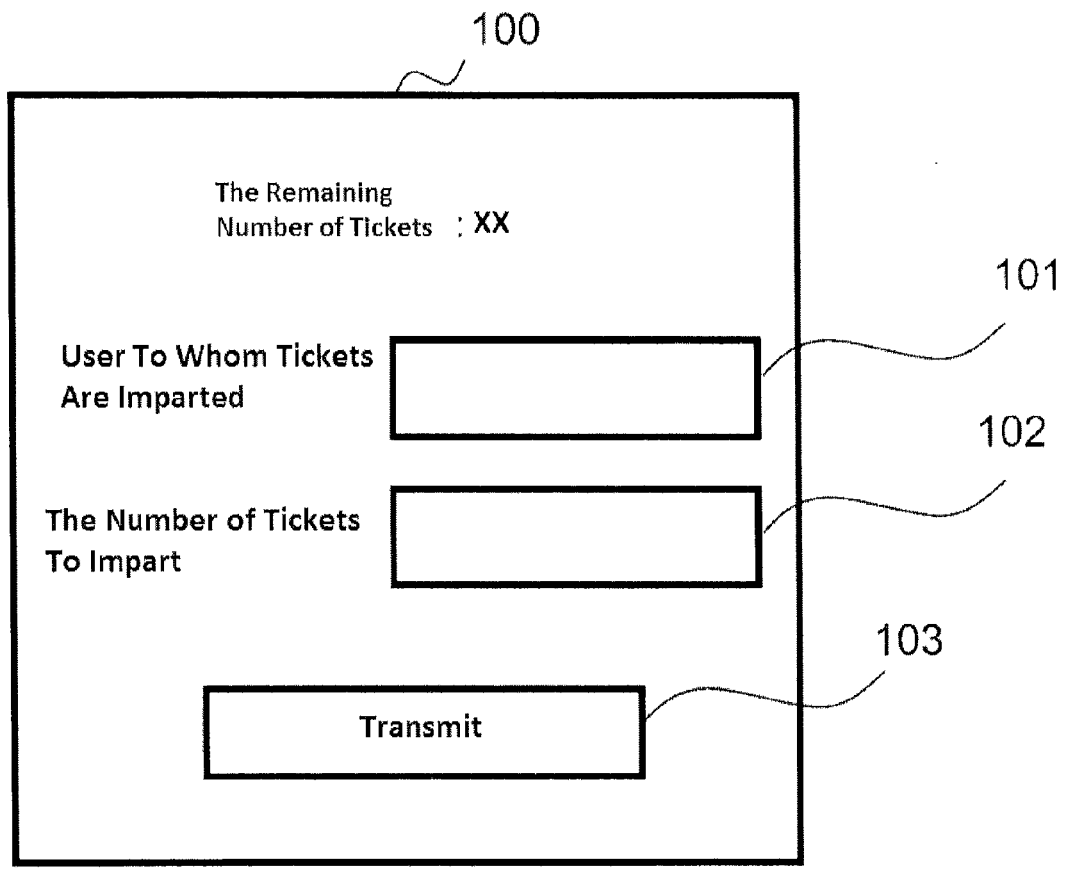
FIG. 9 shows an example of a ticket offering screen 100 according to the embodiment.

The offering process in which a user offers other users the virtual tickets of the user will be now described. Offering of the virtual tickets to other users may be performed through a ticket offering screen 100 illustrated in FIG. 9. The ticket offering screen 100 may be a screen linked to a screen where the user's profile is managed or the like. As shown in FIG. 9, on the ticket offering screen 100, the number of the virtual tickets which the user possesses may be shown on the upper side of the screen, and a destination user entry field 101 in which a user to whom a virtual ticket is provided is selected and entered, a number entry field 102 in which the number of virtual tickets to offer is entered, and a transmit button 103 follow toward the bottom of the screen. The destination user entry field 101 may allow a user to select and input a user to whom the user offers virtual tickets from among users registered as friends in advance. Alternatively, the user may be allowed to select such a user from among all the users registered in the music distribution server 10. Once the user performs inputs on the destination user entry field 101 and the number entry field 102 and selects the transmit button 103, the entered data may be transmitted to the music distribution server 10. The music distribution server 10 that received the data may update the ticket management table 52a such that the number entered in the number entry field 102 is deducted from the number of the virtual tickets possessed by the user, and the number entered in the number entry field 102 is added to the number of the possessed virtual tickets of the user specified in the destination user entry field 101. Furthermore, the offering of virtual tickets may also be performed when a user recommends a piece of music to other users through the track recommendation screen 90. In this way, the user who is recommended the piece of music can use the offered ticket to playback the piece of music, and moreover it is possible to promote communication between users within the service.

Next, another embodiment of the disclosure will be described. A music distribution server 110 according to the other embodiment may have the identical hardware configuration as the music distribution server 10 according to the above embodiment. Therefore the corresponding components of the music distribution server 110 according to the other embodiment are given the reference numerals identical to those of the music distribution server 10 according to the embodiment.

Figure 10:
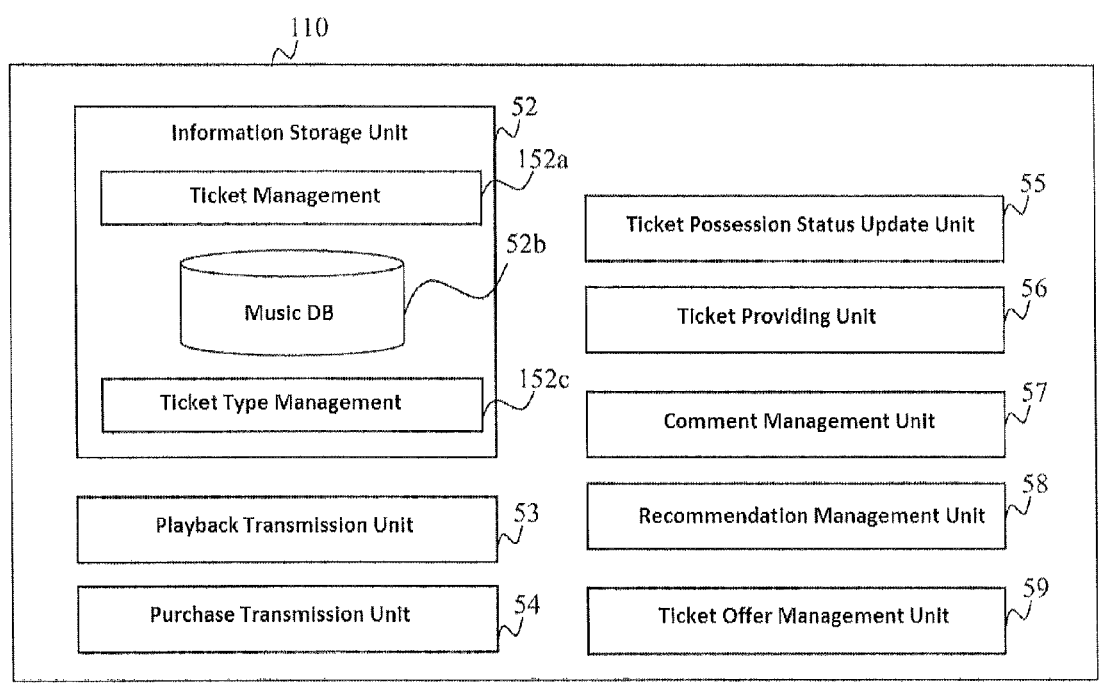
FIG. 10 is a block diagram illustrating the functionality of the music distribution server according to another embodiment.

FIG. 10 is a block diagram illustrating the functionality of the music distribution server 110 according to the other embodiment. The information storage unit 52 of the music distribution server 110 according to the other embodiment may include a ticket management table 152a instead of the ticket management table 52a, and a ticket type management table 152c that manages information about types of virtual tickets. Moreover, like the music distribution server 10 according to the embodiment, the music distribution server 110 may include the playback transmission unit 53, the purchase transmission unit 54, the ticket possession status update unit 55, the ticket providing unit 56, the comment management unit 57, the recommendation management unit 58, and the ticket offer management unit 59. These functions may be implemented through cooperation between the CPU 11 and programs, tables, and the like stored in the main memory 12 and the external memory 15.

FIG. 11 shows an example of the ticket management table 152a according to the other embodiment. The ticket management table 152a may store information, in association with the "user ID" that identifies each user, such as "ticket ID" that identifies a virtual ticket which the user possesses, "ticket type ID" that identifies a type of the virtual ticket, "remaining usage information" that indicates the remaining number of uses and time of the virtual ticket and the like. FIG. 12 shows an example of a ticket type management table 152c. As illustrated in FIG. 12, the ticket type management table 152c may store information, in association with the "ticket type ID" that identifies each virtual ticket type, such as "track restriction" that indicates pieces of music allowed to play with one type of virtual tickets, "limit of the number of plays and time" that indicates the number of plays and a time duration allowed for the type of virtual tickets, and the like. For example, the ticket type ID "TT01" does not have restriction on pieces of music allowed to playback and only one play is allowed. The ticket type ID "TT02" is allowed to playback only the pieces of music of a specific artist A and only one play is allowed with the ticket. The ticket type ID "TT03" does not have restriction on pieces of music allowed to playback and three plays of a piece of music are allowed. The ticket type ID "TT04" does not have restriction on pieces of music allowed to playback and the playback is allowed for 60 minutes. The ticket type ID "TT05" is allowed to playback only a specific piece of music "a" and is allowed to playback the piece only once. As described above, in the music distribution server 110 according to the other embodiment, conditions to allow music data to be played including a piece of music allowed to play, the allowed number of plays and play time and the like are set for each type of virtual tickets. As for the allowed number of plays and play time, the remaining number of plays and the remaining play time of each virtual ticket are managed in the ticket management table 152a.

Figure 13:
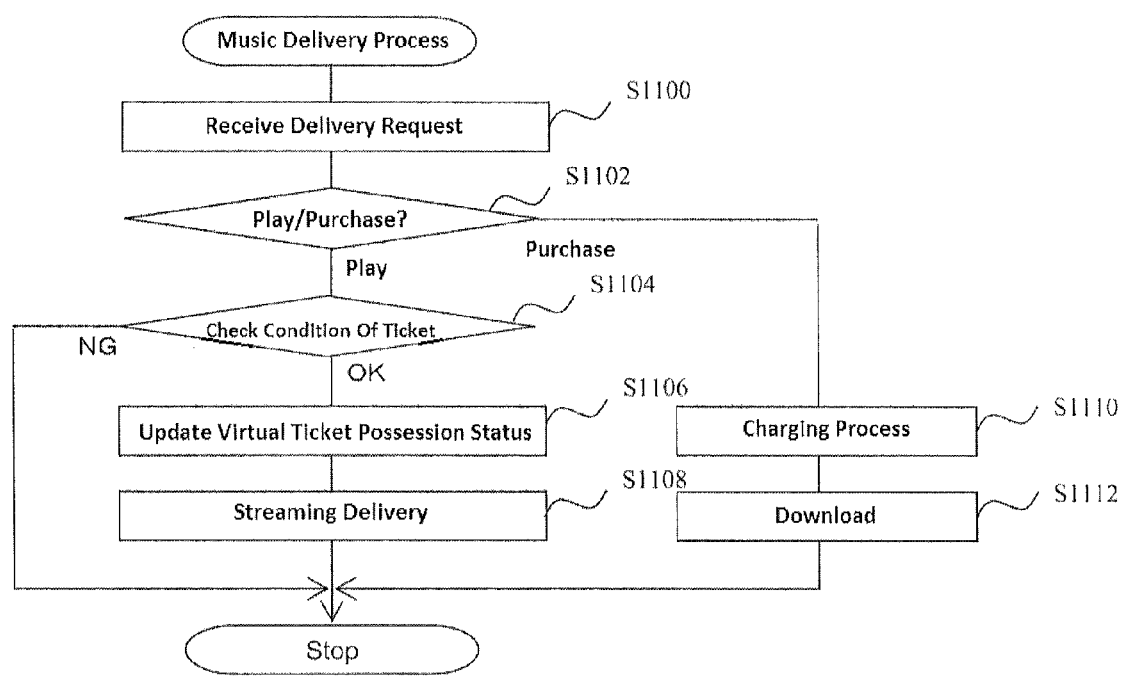
FIG. 13 is a flow diagram showing a music delivery process according to the other embodiment.
Figure 14:
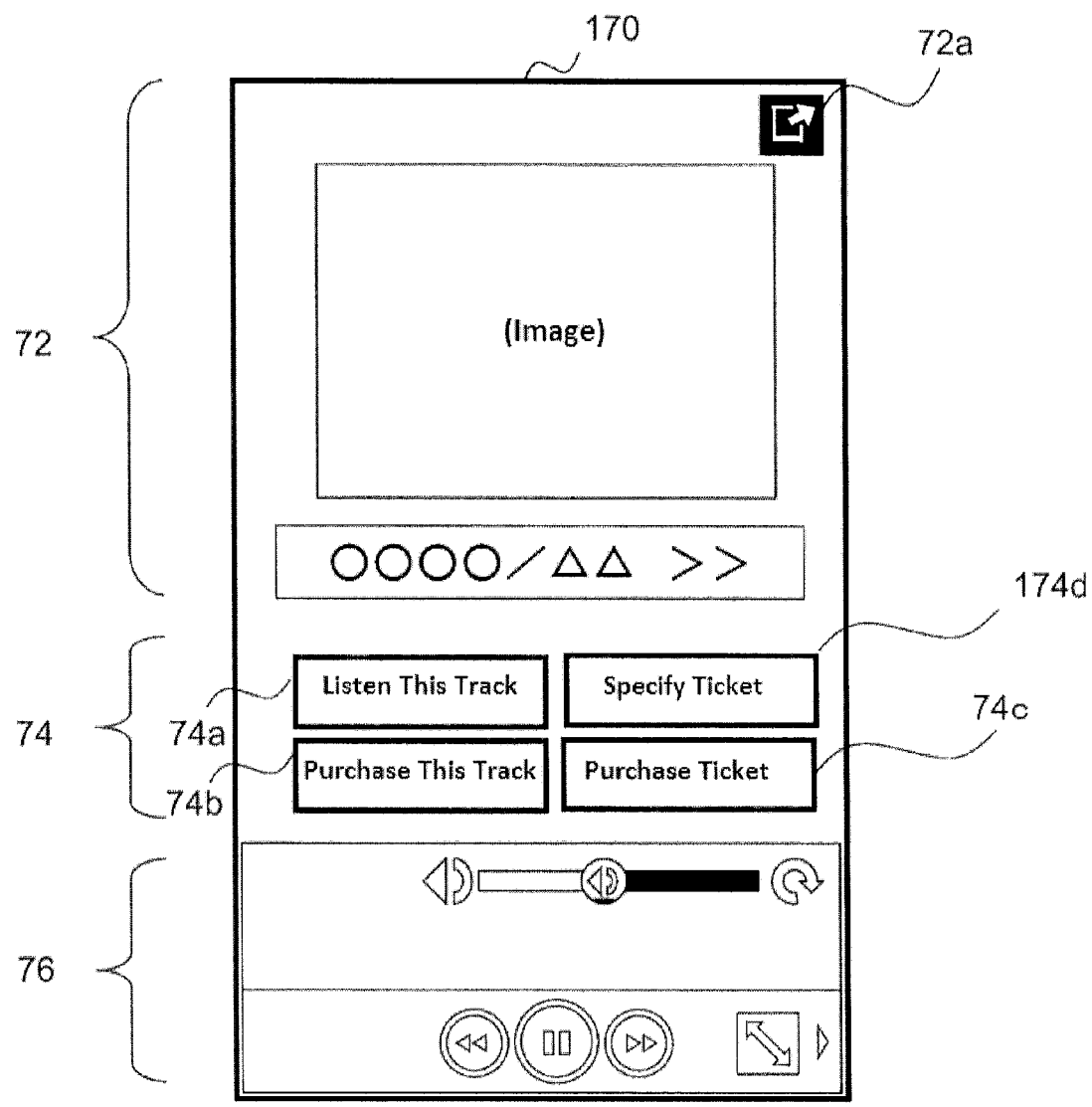
FIG. 14 shows an example of a basic screen 170 according to the other embodiment.
Figure 15:
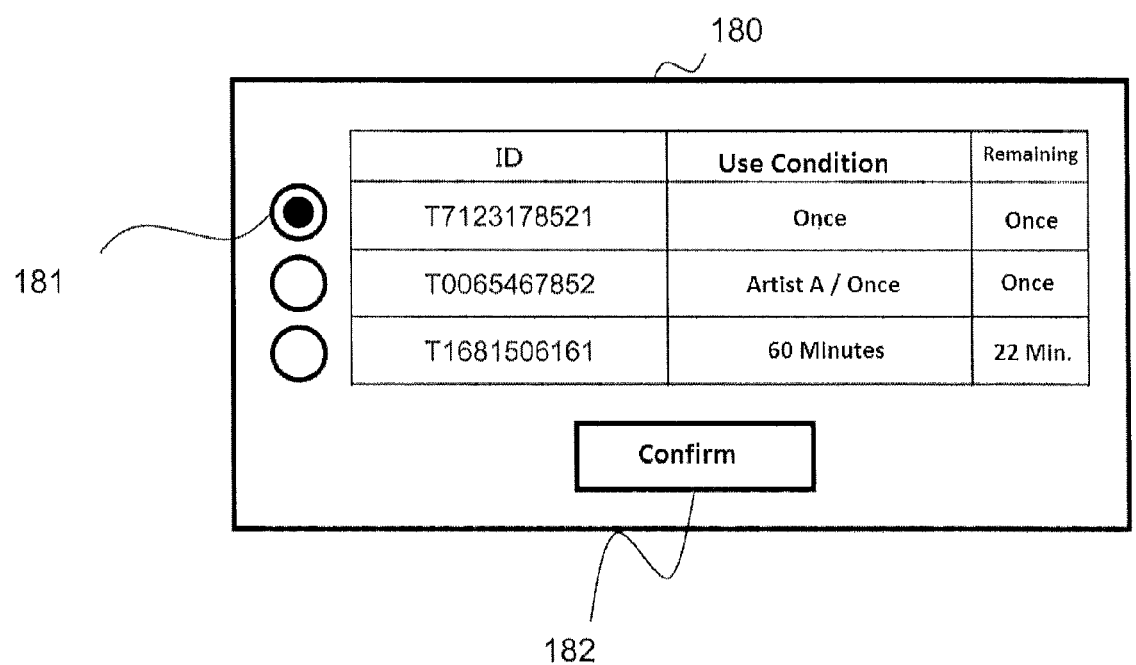
FIG. 15 shows an example of a ticket offering screen 180 according to the other embodiment.

FIG. 13 is a flow diagram showing an example of a music delivery process performed by the music distribution server 110 according to the other embodiment. In the music delivery process of FIG. 13, a distribution request from a user who operates the terminal device 30 may be firstly received (step S1100). According to the other embodiment, data to request delivery of music data may be transmitted from the terminal device 30 when the user operates a basic screen 170 illustrated in FIG. 14 instead of the basic screen illustrated in FIG. 6 according to the above embodiment. As shown in FIG. 14, the basic screen 170 may include a ticket specifying button 174d represented as "specify ticket" instead of the indication "the number of the virtual tickets possessed by the user" in the request operation section 74 on the basic screen 70 according to the above embodiment. Before the user selects the playback request button 74a, the user may select the ticket specifying button 174d to specify a virtual ticket used for playback of music data. FIG. 15 shows an example of a ticket specifying screen 180 displayed when the ticket specifying button 174d on the basic screen 170 is selected. As shown in FIG. 15, the ticket specifying screen 180 may show a list of information about virtual ticket which a user possesses (the ticket ID, the ticket use conditions (restriction on pieces of music allowed to play, the limitations of plays and time), the remaining number of uses/time), and the user may select a desired virtual ticket from among the virtual tickets listed on the screen by using a virtual ticket selecting section 181, and then select a confirm button 182. In this manner, the user may be able to specify the virtual ticket used for playback of music data. The list of the information about the virtual tickets may be obtained from the ticket management table 152a and the ticket type management table 152b and then displayed.

Referring again to the flow diagram of FIG. 13, when a user selected a playback request button 174a on the basic screen 170, it may be determined that a playback request of music data using a virtual ticket is made (step S1102) and the use condition of the specified virtual ticket may be then checked (step S1104). For instance, when the specified virtual ticket is restricted to pieces of music of the "artist A" and the piece of music selected on the basic screen 170 is a song of a different artist, it is determined that the use condition of the virtual ticket is not satisfied and the music delivery process may be terminated without delivering the music data to the user.

Whereas when the use condition of the specified virtual ticket is satisfied, the virtual ticket possession status of the user may be updated (step S1106). More specifically, the "remaining usage information" in the ticket management table 152a may be updated and if the remaining number of uses or time becomes zero (0), the record may be deleted. After updating the virtual ticket possession status, streaming delivery of the music data may be performed (step S1108) in the same manner as the music delivery process of the above embodiment illustrated in FIG. 5, and the music delivery process may be terminated. When the purchase request button 74b on the basic screen 170 was selected by a user, in the same manner as the music delivery process according to the embodiment illustrated in FIG. 5, it may be determined that a purchase request of music data is performed (step S1102) and a charging process for the music data purchase may be performed (step S1110). Thereafter download of the selected music data may be performed (step S1112) and the music delivery process may be then terminated.

According to the above-described embodiment, the possession status of the virtual ticket used for playback of music data is managed for each user. Thus, it is possible to provide a music distribution service in which users more easily enjoy playback of music data using the virtual tickets. Since music data of the full length of a piece of music is performed through streaming delivery, a user can easily enjoy the entire song. Moreover, virtual tickets are imparted in response to the user's actions such as the input of a comment on a piece of music and the recommendation of the piece of music to other users. Therefore, it is possible to motivate users to take such actions and to activate communication between users within the service. Furthermore, it is possible to have the playback of music data using virtual tickets recognized among users. In addition, since a user can offer other users a virtual ticket which the user holds, it is possible to further activate the communication between users within the service.

Furthermore, according to the other embodiment of the disclosure, the conditions to allow playback (the restriction on pieces of music to be played, the limited number of plays and time, and so on) are set for each type of the virtual tickets, thereby variation of the virtual tickets are increased. Consequently it is possible to enhance the playback service of music data using the virtual tickets.

Although a virtual ticket is imparted to a user when the user performs a purchase request of a virtual ticket, inputs a comment on a piece of music, and makes recommendation of the piece of music to other users in the above-described embodiment, chances to impart the virtual ticket are not limited to these. For example, a virtual ticket may be imparted to users when the users login to the music distribution server 10, 110.

In the above embodiments, the playback service in which streaming delivery of music data is performed and the purchase service in which download of music data is performed are provided to users. However, in addition to these, it should be appreciated that a preview service in which streaming delivery of a limited portion of music data is performed with no expense can be provided to users. In this case, the streaming delivery of a limited portion of music data may be performed not for free but with a virtual ticket. Moreover, it is possible for the system to provide only the playback service in which the streaming delivery of music data is performed, Furthermore, the playback service may be provided in the manner such that music data is delivered in any method in which reuse of music data is allowed on a terminal device instead of the streaming method in which the reuse is restricted on the terminal device.

It is appreciated that digital contents such as video data may be distributed instead of music data. Moreover, it is also appreciated that electronic books, applications and the like may be distributed. In this case, when such digital contents may be distributed in response to a playback request, the digital contents are delivered in a method in which reuse of the digital contents is restricted in the terminal device 30. Whereas such digital contents are distributed in response to a purchase request, the digital contents may be delivered in a method in which reuse of the digital contents is allowed.

In the other embodiment, the restriction on pieces of music to be played, the limited number of plays and time have been described as the conditions to allow playback set for each type of virtual tickets. However, all of these conditions may not be necessarily set but only one or some of the conditions may be set. Moreover, other conditions (for instance, a time slot of day in which playback is allowed) may be set as the conditions to allow playback.

The processes and procedures described and illustrated herein may also be implemented by software, hardware, or any combination thereof other than those explicitly stated for the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described herein are executed by a single apparatus, software piece, component, or module, such processes and procedures may also be executed by a plurality of apparatuses, software pieces, components, and/or modules. Even if the data, tables, or databases described herein are stored in a single memory, such data, tables, or databases may also be dispersed and stored in a plurality of memories included in a single apparatus or in a plurality of memories dispersed and arranged in a plurality of apparatuses. The elements of the software and the hardware described herein can be integrated into fewer constituent elements or can be decomposed into more constituent elements.

With respect to the use of substantially any plural and/or singular terms herein, those having skill in the art can translate from the plural to the singular and/or from the singular to the plural as is appropriate to the context.

What is claimed is:

1. A playback management device for managing playback of digital contents by a user who operates a user terminal device connected via a communication network and is provided with the digital contents, comprising:

a ticket providing unit configured to provide a virtual ticket to the user in response to a predetermined action by the user, the virtual ticket being required for a single playback of a digital content selected from among the digital contents;

an information storage unit configured to store the number of the virtual tickets possessed by the user in association with the user;

a playback transmission unit configured to, in response to a playback request of a first digital content selected from among the digital contents by the user, transmit the first digital content to the user terminal device which the user operates, and cause the user terminal device to play the first digital content, the playback request being made through a predetermined screen where at least the number of the virtual tickets possessed by the user is shown; and a possession status update unit configured to reduce the number of the virtual tickets possessed by the user who performed the playback request stored in the information storage unit by one in response to transmission of the first digital content, wherein the playback transmission unit is configured to, in response to a playback request of a second digital content selected from among the digital contents by the user, transmit the second digital content to the user terminal device which the user operates and cause the user terminal device to play the second digital content, the second digital content is identical or different to the first content, the playback request of the second digital content is made through the predetermined screen, and the possession status update unit is configured to further reduce the number of the virtual tickets possessed by the user who performed the playback request stored in the information storage unit by one in response to transmission of the second digital content, and wherein the predetermined action by the user comprises performance, via the communication network, of at least one of a purchase request of the virtual ticket, an input of a comment on the digital content, and an input of recommendation information of the digital content.

2. The playback management device of claim 1, further comprising:
a purchase transmission unit configured to transmit, in response to a purchase request of a digital content from a user, the digital content to a user terminal device which the user specifies in a method in which reuse of the digital content in the user terminal device is allowed,
wherein the playback transmission unit is configured to transmit the digital content to the user terminal device in a method in which reuse of the digital content is restricted in the user terminal device.

3. The playback management device of claim 1, wherein the playback transmission unit is configured to cause the user terminal device to playback the whole of the digital content.

4. The playback management device of claim 1, wherein a condition to allow playback of the digital content is set for the virtual ticket,
the playback transmission unit is configured to transmit the digital content when playback of the digital content of the playback request satisfies the condition to allow playback for the virtual ticket which the user of the playback request possesses.

5. The playback management device of claim 1, further comprising:
a comment management unit configured to necessarily receive the input of the comment on the digital content from the user, and to store the comment in the information storage unit in a manner where other users are accessible to the comment.

6. The playback management device of claim 1, further comprising:
a recommendation management unit configured to necessarily receive the input of the recommendation information of the digital content to other users from the user, and to store the recommendation information in the information storage unit in a manner where other users are accessible to the recommendation information.

7. The playback management device of claim 1, further comprising:
a ticket offer management unit configured to receive, from the user, an offering request to offer other user the virtual ticket which the user possesses, and to update the number of virtual tickets possessed by the user stored in the information storage unit in response to offering of the virtual ticket to the other user from the user.

8. The playback management device of claim 1, wherein the digital contents include at least one of music data and video data.

9. A non-transitory storage medium storing a program causing a computer to function as a playback management device for managing playback of digital contents by a user who operates a user terminal device that is connected via a communication network and is provided with digital contents, the computer being accessible to an information storage unit configured to store the number of virtual tickets possessed by the user in association with the user, the virtual ticket being required for a single playback of a digital content selected from among the digital contents, the program causing the computer to:
provide the virtual ticket to the user in response to a predetermined action by the user,
perform a playback transmission process by, in response to a playback request of the first digital content selected from among the digital contents by the user; transmitting a first digital content to the user terminal device which the user operates and causing the user terminal device to play the first digital content, the playback request being made through a predetermined screen where at least the number of the virtual tickets possessed by the user is shown; and
perform a possession status update process by reducing the number of the virtual tickets possessed by the user who performed the playback request stored in the information storage unit by one in response to transmission of the first digital content,
wherein the playback transmission process includes a process to, in response to a playback request of a second digital content selected from among the digital contents by the user, transmit the second digital content to the user terminal device which the user operates and cause the user terminal device to play the second digital content, the second digital content is identical or different to the first content, the playback request of the second digital content is made through the predetermined screen, and
the possession status update process includes further reducing the number of the virtual tickets possessed by the user who performed the playback request stored in the information storage unit by one in response to transmission of the second digital content, and
wherein the predetermined action by the user comprises performance, via the communication network, of at least one of a purchase request of the virtual ticket, an input of a comment on the digital content, and an input of recommendation information of the digital content.

* * * * *